M. A. CRAVATH.
Wheel-Plow.
No. 19,077.
2 Sheets—Sheet 1.
Patented Jan. 12, 1858.
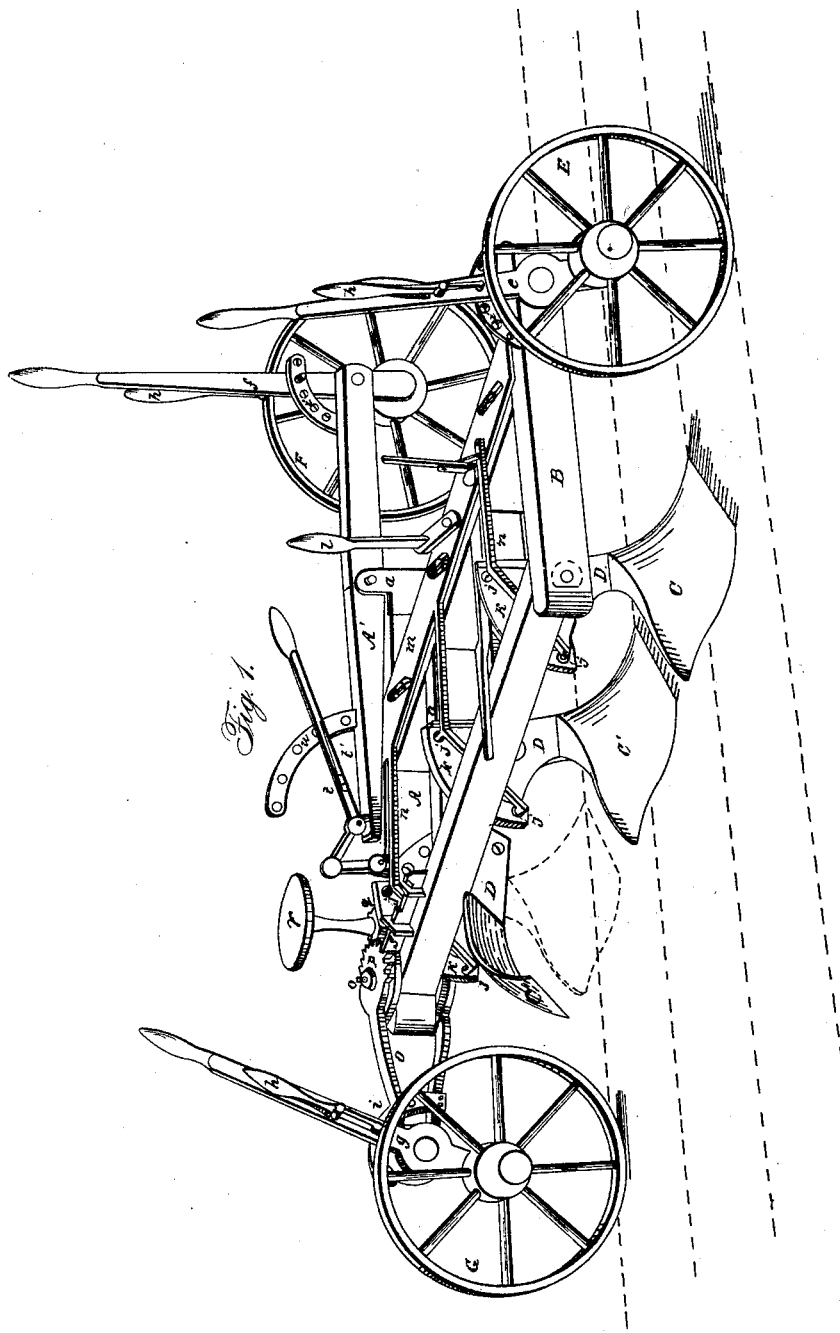

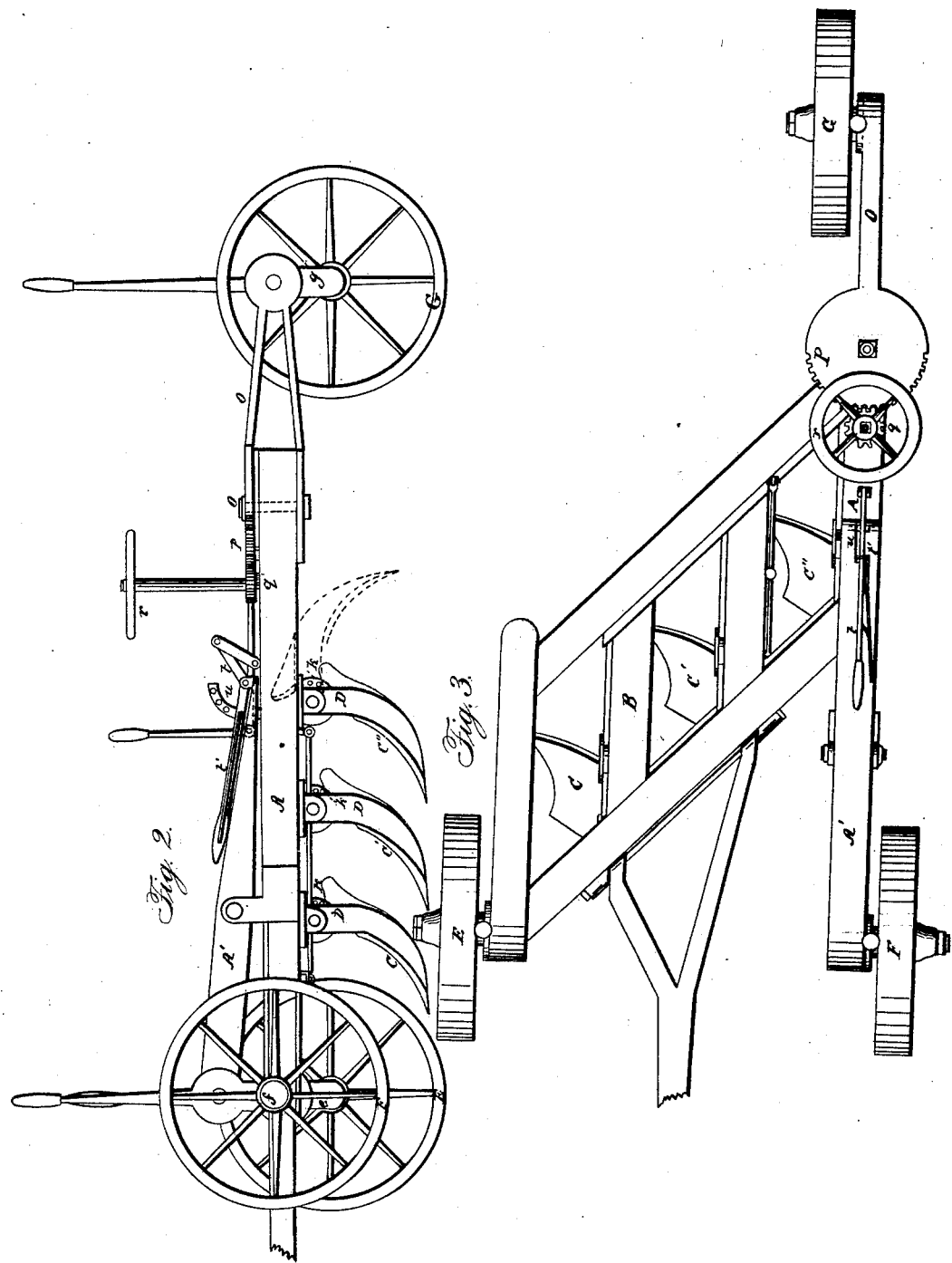

UNITED STATES PATENT OFFICE.

M. A. CRAVATH, OF LODA, ILLINOIS.

IMPROVEMENT IN GANG-PLOWS.

Specification forming part of Letters Patent No. 19,077, dated January 12, 1858.

*To all whom it may concern:*

Be it known that I, MYRTILLUS A. CRAVATH, of Loda, Iroquois county, Illinois, have invented new and useful Improvements in Gang-Plows; and I hereby declare the following to be a full and exact description thereof, reference being had to the accompanying drawings, making part of this specification.

The leading points of novelty in this invention are, first, a peculiar arrangement of gage-wheels, whereby they are kept entirely clear of the newly-plowed ground; second, a method of attaching the plows to the frame, so as to facilitate their being thrown out of and into the ground and retained in either position; third, an improved construction of landside-beam for adjustment of the depth of plowing.

In the annexed drawings, Figure 1 is a perspective view of the implement from the rear and furrow side, exhibiting one plow thrown back. Fig. 2 is a side elevation taken on the land side of the implement as in the act of plowing. Fig. 3 is a top view of the same.

A A' B is the frame of the implement.

C C' C'' are the plows, ranging at an angle of about forty-five degrees with the line of draft.

k are brackets attached to the frame, to which brackets the standards D of the plows are so hinged as to admit of their being rotated in a vertical plane. The brackets k and standards D are correspondingly perforated, so as by the insertion of pins j to hold the plows at any required position or pitch. The pins j may be simultaneously inserted or withdrawn by means of a lever, l, and connecting-rods m n.

E F G are wheels, by means of which the implement is supported and the depth of plowing regulated. The wheel E is placed on the furrow side of the implement, distant the width of a furrow from the front plow, and nearly or quite in range with the gang. The wheel F is placed nearly abreast of the wheel E, and so far on the land side of the implement as in plowing to run always on the unbroken land. The wheel G runs in the wake of the rear plow of the gang. The axles of the wheels E F G are not attached directly to the frame, but are mounted on the ends of arms e f g, which arms are so hinged to the frame as to admit of their vibration in vertical planes. A spring-catch, h, engaging in a rack or perforated bracket, i, holds each wheel at any elevation to which it may be brought.

The beam A', to which the arm f of the wheel F is hinged, is itself also hinged horizontally at a to the beam A of the frame. A compound lever, t, being connected to the rear end of this beam A', enables the elevation and depression of the wheel F, and a spring-catch, t', engaging in a rack or perforated bracket, u, retains the wheel at any height at which it may be placed. The two pieces A A' thus connected I style collectively "the jointed landside-beam A A'."

The arm g of the rear wheel, G, is hinged horizontally to an arm, O, which, being hinged vertically at o to the rear end of the beam A, and being provided with a segmental rack, p, is placed at any desired angle horizontally by means of a pinion, q, operated by a hand-wheel, r. A bolt, s, engaging in the rack p, retains the wheel G at any angle to which it may be adjusted.

The operation is as follows: In plowing the first "through," both front wheels, E F, are so elevated as to run on the level of the unbroken land, the other parts being in the positions indicated in Fig. 2. In subsequent throughs the wheel F continues running on the unbroken surface or land; but the wheel E, having been suitably lowered, runs along the hard and level bottom of the nearest furrow of the previous through. The wheel G runs in the furrow just made by the rear plow of the gang. The depth and direction of plowing are regulated while the plow is in motion by means, respectively, of the lever t and hand-wheel r. When it is desired to turn round at the end of a through the pins j are withdrawn, causing the plows by the onward motion of the machine to be immediately thrown back and out of the ground, in which position they are retained by the re-insertion of the pins j. (See representation of rear plow in Fig. 1, and dotted lines in Fig. 2.) The lever t being then elevated, (and, if necessary, the arms e f g also,) the plows are raised entirely clear of the ground, and the implement may be freely turned or conveyed from place to place. On the withdrawal of the pins j the plows fall with their points on the ground, when a slight backward motion of the implement brings them again into position. The pins $j$ are then reinserted, and the work proceeds as before.

If it be preferred, the pins $j$ may be operated by separate levers, so as to release any individual plow to enable it to pass an obstruction.

Suitable levers may be attached to the standards D to raise the plows independently of the motion of the implement.

The pins which retain the plows in a working position may be of wood, so as to permit the self-liberation of any plow on striking an unyielding object.

The described relative bearings and arrangement of the plows and of the wheels are such as have been found most efficient after much careful experiment on a full scale. For the sake of simplicity of illustration but three plows are here shown; but a greater number can be advantageously operated together. For example, I may state that I am now working a gang of eight very successfully.

Among well-known advantages possessed by the gang-plow over others may be mentioned that one man is enabled to do the work of a number, and also that the weight of the plow and the downward and side pressure involved in raising and turning over the furrow-slice are transferred from the sole and landside of the plow to lubricated axles, enabling the landside plate and bar to be entirely dispensed with, and reducing the draft at least one-third.

The following are some of the advantages peculiar to my invention:

First, all the wheels are entirely clear of the plowed ground, which is thus left in better condition, the draft much reduced, and facility afforded for sowing simultaneously with plowing.

Second, the plows are readily thrown out of or into action by automatic movement derived from the draft.

Third, the depth, pitch, and direction of the plows are placed under convenient control of the operator.

I claim as new and of my invention herein—

1. The method substantially as described of attaching the plows to the frame, whereby they are made capable of being thrown out of and into action by partial rotation on their axes, as exhibited.

2. In combination with the above, the described arrangement of the wheels E F G, whereby the chief weight of the implement devolves upon the wheels E F, which run on the level bottom of the furrow.

3. The described construction and arrangement of the jointed landside-beam A A', in combination with the lever $t$ and rack $u$, or equivalent devices, operating substantially as set forth.

In testimony of which invention I hereunto set my hand.

MYRTILLUS A. CRAVATH.

Attest:
   OCT. KNIGHT,
   WILLIAM HAMILTON.